United States Patent
Wang et al.

(10) Patent No.: US 11,687,063 B2
(45) Date of Patent: Jun. 27, 2023

(54) SEMANTICS-BASED INTERNET OF THINGS DEVICE DATA PROCESSING-RELATED APPLICATION INSTALLATION METHOD AND APPARATUS

(71) Applicant: Siemens Aktiengesellschaft, Munich (DE)

(72) Inventors: Xiao Feng Wang, Beijing (CN); Yong Yuan, Beijing (CN); Ming Yu, Wuhan (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 181 days.

(21) Appl. No.: 17/262,267

(22) PCT Filed: Jul. 24, 2018

(86) PCT No.: PCT/EP2018/070027
§ 371 (c)(1),
(2) Date: Jan. 22, 2021

(87) PCT Pub. No.: WO2020/020443
PCT Pub. Date: Jan. 30, 2020

(65) Prior Publication Data
US 2021/0263506 A1    Aug. 26, 2021

(51) Int. Cl.
*G05B 19/418* (2006.01)
*G16Y 40/35* (2020.01)
(Continued)

(52) U.S. Cl.
CPC ... *G05B 19/41865* (2013.01); *G05B 19/4185* (2013.01); *G06F 8/61* (2013.01);
(Continued)

(58) Field of Classification Search
None
See application file for complete search history.

(56) References Cited

U.S. PATENT DOCUMENTS 11,258,855 B2 * 2/2022 Sterkel ................ H04L 67/303
11,362,887 B2 * 6/2022 Chen .................... H04W 4/70
(Continued)

OTHER PUBLICATIONS

Wikipedia "Semantic data model"; retrieved on Apr. 4, 2019; Oct. 27, 2017 (Oct. 27, 2017), XP055577820; Retrieved from the Internet: URL:https://en.wikipedia.org/w/index.php?title=Semantic data model&oldid-807380603; 2017.
(Continued)

*Primary Examiner* — Philip Wang
(74) *Attorney, Agent, or Firm* — Harness, Dickey & Pierce, P.L.C.

(57) ABSTRACT

A semantics-based Internet of Things (IOT) device data processing-related application installation method and apparatus are disclosed. In an embodiment, the method includes receiving a data processing demand from a client, retrieving, from an industrial cloud, at least one application which needs to be installed for fulfilment of the data processing demand, and analyzing required source data and an installation demand of the application; analyzing at least one device end capable of providing the source program in the IOT to determine whether the device meets the installation demand of the application and provides the required source data; and installing the application in a gateway corresponding to the device end, upon the device end being determined to be able to meet the installation demand of the application.

17 Claims, 4 Drawing Sheets

(51) Int. Cl.
  *G16Y 40/20*  (2020.01)
  *G06F 8/61*  (2018.01)
  *H04L 67/12*  (2022.01)

(52) U.S. Cl.
  CPC .............. *G16Y 40/20* (2020.01); *G16Y 40/35* (2020.01); *H04L 67/12* (2013.01)

(56) References Cited

U.S. PATENT DOCUMENTS

| | | | | |
|---|---|---|---|---|
| 11,477,014 | B1* | 10/2022 | Frasco | H04L 9/0662 |
| 2006/0253849 | A1* | 11/2006 | Avram | G06F 9/445 |
| | | | | 717/172 |
| 2008/0177711 | A1* | 7/2008 | Blake | G06F 8/61 |
| 2016/0072891 | A1* | 3/2016 | Joshi | G06Q 30/0641 |
| | | | | 370/254 |
| 2016/0188609 | A1* | 6/2016 | Strassner | G06F 16/81 |
| | | | | 707/740 |
| 2017/0026307 | A1 | 1/2017 | Cheng | |
| 2018/0060307 | A1* | 3/2018 | Misra | G06N 3/08 |
| 2018/0063290 | A1* | 3/2018 | Yang | G06F 9/4881 |
| 2018/0095963 | A1* | 4/2018 | Verma | G06F 16/313 |
| 2018/0121424 | A1* | 5/2018 | Dumant | G06F 16/22 |
| 2018/0137424 | A1* | 5/2018 | Gabaldon Royval | G06N 5/022 |
| 2019/0129734 | A1* | 5/2019 | Yang | G06F 9/44526 |
| 2022/0329338 | A1* | 10/2022 | Schnieders | H04J 3/0667 |

OTHER PUBLICATIONS

PCT International Search Report and Written opinion of International Searching Authority dated Apr. 15, 2019 corresponding to PCT International Application No. PCT/EP2018/070027 filed on Jul. 24, 2018.

* cited by examiner

SEMANTICS-BASED INTERNET OF THINGS DEVICE DATA PROCESSING-RELATED APPLICATION INSTALLATION METHOD AND APPARATUS

PRIORITY STATEMENT

This application is the national phase under 35 U.S.C. § 371 of PCT International Application No. PCT/EP2018/070027 which has an International filing date of Jul. 24, 2018, which designated the United States of America, the entire contents of which are hereby incorporated herein by reference.

FIELD

Embodiments of the present invention generally relate to the field of the industrial Internet of Things, in particular to a semantics-based Internet of Things device data processing-related application installation method and apparatus.

BACKGROUND

In intelligent factories, data processing systems based on the Internet of Things (IOT) have played an important role in the collection of factory data and the uploading of collected data to an industrial cloud.

SUMMARY

The inventors have discovered that in actual applications, the amount of industrial data collected in a period of time is always very large, and IOT data processing systems find it difficult to upload all the data promptly to the industrial cloud when network broadband is limited.

A first embodiment of the present invention provides a semantics-based Internet of Things (IOT) device data processing-related application installation method, comprising the following steps: a receiving and analysis step: receiving a data processing demand from a client, retrieving, from an industrial cloud, at least one application which needs to be installed for fulfilment of the data processing demand, and analysing required source data and an installation demand of the application; an analysis and determining step: analysing at least one device end capable of providing the source program in the IOT, and thereby determining whether the device meets the installation demand of the application and provides the required source data; an installation step: installing the application in a gateway corresponding to the device end, when the device end is able to meet the installation demand of the application.

A second embodiment of the present invention provides a semantics-based IOT device data processing-related app installation apparatus, comprising a scheduling module, used for: receiving a data processing demand from a client, retrieving, from an industrial cloud, at least one application which needs to be installed for fulfilment of the data processing demand, and analysing required source data and an installation demand of the application; analysing at least one device end capable of providing the source program in the IOT, and thereby determining whether the device meets the installation demand of the application and provides the required source data; installing the application in a gateway corresponding to the device end, when the device end is able to meet the installation demand of the application. The present invention can evaluate the performance and the semantic model of the gateway of the IOT device end, according to the installation demand and the source data of the application, and thereby install, for the device end of the industrial IOT, the application needed for fulfilment of the client data processing demand, on the basis of the semantic model of the gateway and the application.

KEY TO LABELS USED IN THE DRAWINGS

Figure 1:
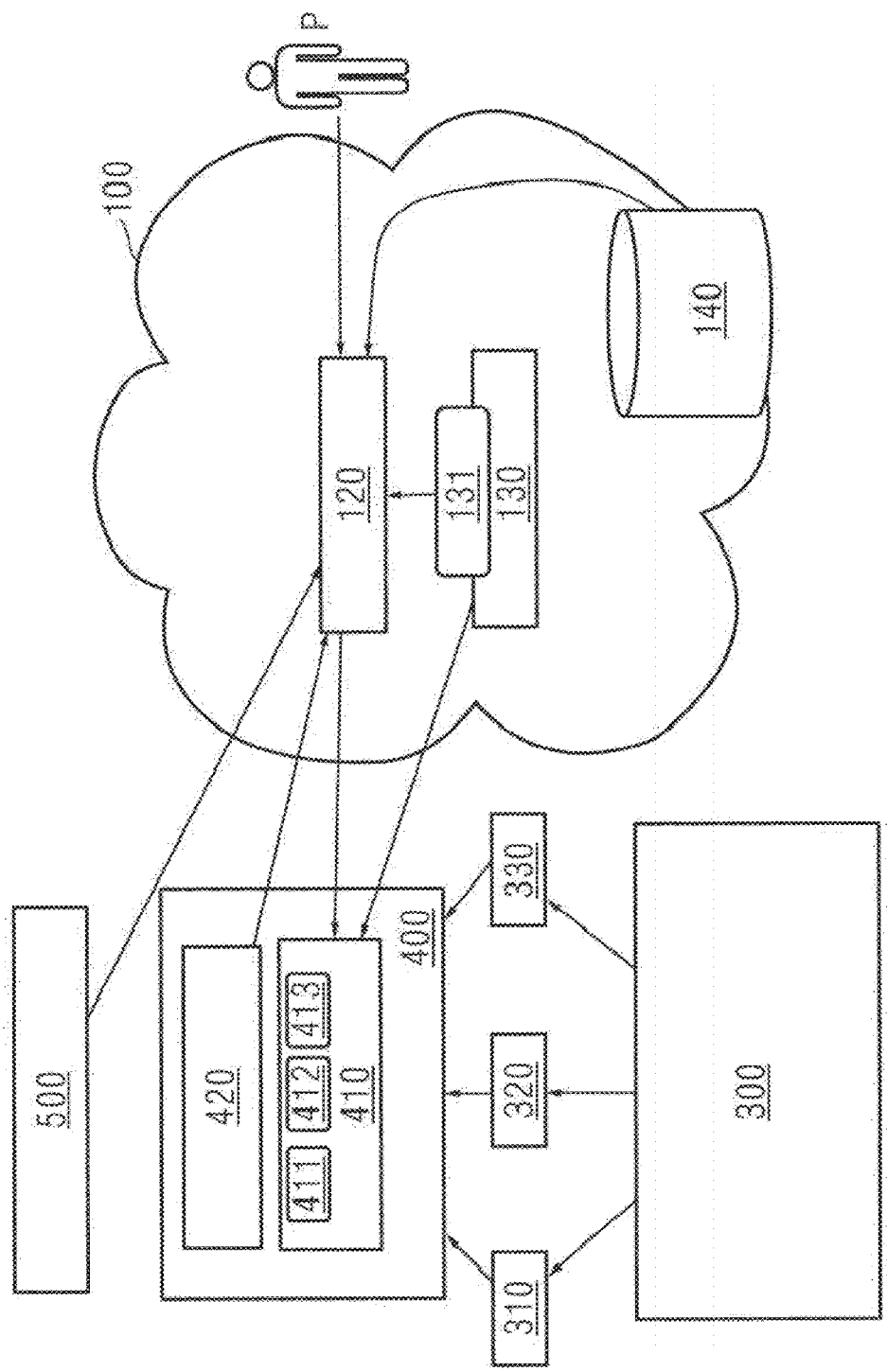
FIG. 1 is a framework diagram of a system for semantics-based IOT device data processing-related application installation according to a particular embodiment of the present invention.

P client
100 industrial cloud
120 scheduling module
130 application library
131 semantic model module
140 workflow library
300 machine tool
310 first sensor
320 second sensor
330 third sensor
311 address model
312 resource model
313 content model
400 gateway
410 application container
411 first application
411a service demand
411b system resource demand
412 second application
413 third application
420 performance module
500 semantic description layer

DETAILED DESCRIPTION OF EXAMPLE EMBODIMENTS

A first embodiment of the present invention provides a semantics-based Internet of Things (IOT) device data processing-related application installation method, comprising the following steps: a receiving and analysis step: receiving a data processing demand from a client, retrieving, from an industrial cloud, at least one application which needs to be installed for fulfilment of the data processing demand, and analysing required source data and an installation demand of the application; an analysis and determining step: analysing at least one device end capable of providing the source program in the IOT, and thereby determining whether the device meets the installation demand of the application and provides the required source data; an installation step: installing the application in a gateway corresponding to the device end, when the device end is able to meet the installation demand of the application.

At least one embodiment of the present invention can evaluate the performance and the semantic model of the gateway of the IOT device end, according to the installation demand and the source data of the application, and thereby install, for the device end of the industrial IOT, the application needed for fulfilment of the client data processing demand, on the basis of the semantic model of the gateway and the application.

Furthermore, in an embodiment the receiving and analysis step further comprises the following steps: receiving a data processing demand from the client, and retrieving a workflow needed for fulfilment of the data processing demand from a workflow library of the industrial cloud; resolving the workflow into multiple applications needed for fulfilment of the workflow;

reading a semantic model of the multiple applications from an application library in the industrial cloud, and analysing required source data and an installation demand of the multiple applications.

Furthermore, in an embodiment the analysis and determining step further comprises the following steps: reading, in a semantic description layer, a semantic model of at least one device end capable of providing the source program in the IOT, analysing the semantic model, and thereby determining whether the device is able to provide the required source data; reading a semantic model of the gateway connected to the device, and thereby determining whether the gateway connected to the device meets the installation demand of the application.

Furthermore, in an embodiment the installation step further comprises the following steps:

retrieving the application from the application library in the industrial cloud, and installing the application in an application container in the gateway corresponding to the device end, when the device end is able to meet the installation demand of the application.

Furthermore, in an embodiment a semantic model of the device end comprises:
  an address model, comprising a name and address of the device end on the IOT;
  a resource model, describing multiple functions of the device end;
  a content model, describing a type and a connection relationship of the device end and another device.

Furthermore, in an embodiment a semantic model of the gateway comprises any one or more of the following:
  CPU occupancy;
  storage space and usable storage space capacity;
  bandwidth;
  throughput.

Furthermore, in an embodiment a semantic model of the application is used for describing a demand of an application needed by a workflow, the demand comprising a service demand and a system resource demand.

Furthermore, in an embodiment the method further comprises the following step: completing the workflow of the data processing demand of the client on the basis of the installed application.

A second embodiment of the present invention provides a semantics-based IOT device data processing-related app installation apparatus, comprising a scheduling module, used for: receiving a data processing demand from a client, retrieving, from an industrial cloud, at least one application which needs to be installed for fulfilment of the data processing demand, and analysing required source data and an installation demand of the application; analysing at least one device end capable of providing the source program in the IOT, and thereby determining whether the device meets the installation demand of the application and provides the required source data; installing the application in a gateway corresponding to the device end, when the device end is able to meet the installation demand of the application.

At least one embodiment of the present invention can evaluate the performance and the semantic model of the gateway of the IOT device end, according to the installation demand and the source data of the application, and thereby install, for the device end of the industrial IOT, the application needed for fulfilment of the client data processing demand, on the basis of the semantic model of the gateway and the application.

Furthermore, in an embodiment the scheduling module is further used for: receiving a data processing demand from the client, and retrieving a workflow needed for fulfilment of the data processing demand from a workflow library of the industrial cloud; resolving the workflow into multiple applications needed for fulfilment of the workflow; reading a semantic model of the multiple applications from an application library in the industrial cloud, and analysing required source data and an installation demand of the multiple applications.

Furthermore, in an embodiment the scheduling module is further used for: reading, in a semantic description layer, a semantic model of at least one device end capable of providing the source program in the IOT, analysing the semantic model, and thereby determining whether the device is able to provide the required source data; reading a semantic model of the gateway connected to the device, and thereby determining whether the gateway connected to the device meets the installation demand of the application.

Furthermore, in an embodiment the scheduling module is further used for:
retrieving the application from the application library in the industrial cloud, and installing the application in an application container in the gateway corresponding to the device end, when the device end is able to meet the installation demand of the application.

Furthermore, in an embodiment a semantic model of the device end comprises:
  an address model, comprising a name and address of the device end on the IOT;
  a resource model, describing multiple functions of the device end;
  a content model, describing a type and a connection relationship of the device end and another device.

Furthermore, in an embodiment a semantic model of the gateway comprises any one or more of the following:
  CPU occupancy;
  storage space and usable storage space capacity;
  bandwidth;
  throughput.

Furthermore, in an embodiment a semantic model of the application is used for describing a demand of an application needed by a workflow, the demand comprising a service demand and a system resource demand.

Furthermore, in an embodiment the scheduling module is further used for: completing the workflow of the data processing demand of the client on the basis of the installed application.

Particular embodiments of the present invention are explained below with reference to the accompanying drawings.

An embodiment of the present invention provides a semantics-based IOT device data processing-related application installation mechanism, which regards a data processing task as a workflow composed of a set of building blocks (computing modules), also called applications (apps). An app can be transferred to a device end of an IOT or an industrial cloud end, e.g. gateways or smart sensor nodes, and the app is finally installed on an end device to which it has been sent. In order to support the running of apps, app containers are disposed at the device end of the IOT or the industrial cloud end; the app containers provide a runtime environment for the running of the apps. In order to construct an app based on a data processing workflow, a scheduler can dynamically generate a workflow execution plan. The workflow execution plan comprises an app-based workflow and a plan for arranging running apps at different device ends of the IOT or the industrial cloud end. The workflow execution plan is generated on the basis of optimization strategies of data processing performance factors.

In distributed data processing, map/reduce-based large data processing technologies for example also take into account the distribution of computation modules to different device ends. The main difference between the present invention and other distributed data processing is that the present invention provides a set of semantic models for IOT model distribution. Using semantic models, the present invention can accomplish IOT resource context-aware and resource capability-aware distributed data processing. "Resource context-aware" indicates whether a resource meets a data processing requirement analysed on the basis of a relationship using a vicinity of another IOT resource; "resource capability-aware" indicates whether an IOT resource has the ability to support a known data processing requirement.

FIG. 1 is a system framework diagram of semantics-based IOT device data processing-related application installation according to a particular embodiment of the present invention. As shown in FIG. 1, an industrial cloud 100 and multiple gateways and devices coupled to the industrial cloud are arranged in an IOT; in this embodiment, only one gateway 400, and a machine tool 300 corresponding to the gateway, are shown; three vibration sensors are further connected to the machine tool 300, specifically a first sensor 310, a second sensor 320 and a third sensor 330. A semantic description layer 500 of the IOT device end is used for performing semantic description of the device end. The industrial cloud 100 comprises a scheduling module 120, an app library 130 and a workflow library 140, wherein the app library 130 comprises a semantic model module 131 of multiple apps. The gateway 400 comprises an app container 410 and a performance module 420. The app container 410 contains multiple apps, specifically a first app 411, a second app 412 and a third app 413. A client P submits a data processing demand to the industrial cloud 100; the industrial cloud 100 analyses the data processing demand, determines a workflow needed for fulfilment of the data processing demand and resolves the workflow into multiple apps. The industrial cloud 100 and the gateway 400 determine an installation demand and a source program needed for installation of the apps, determine which IOT device ends are capable of installation, and finally install, at end devices, the apps which need to be installed for execution of a user data analysis demand.

The semantics-based IOT device data processing-related application installation method provided in the first aspect of the present invention is presented below with reference to FIG. 1. The generation of a workflow execution plan is based on a workflow defined by an expert for a specific data processing task, e.g. a life cycle prediction based on a root mean square of a vibration sensor signal. This step performs semantic matching between a semantic description of a data processing task and a service provided by an app. Next, a determination is made as to which app container feasible device is suitable for running the specific app in the workflow; specifically, an app distribution plan is established on the basis of the IOT semantic description layer 500, the IOT performance module 420 and an app semantic model. Once the app distribution plan has been established, apart from semantic matching between device performance and system resources, the scheduling module 120 makes a strategy for processed data which is as close as possible. This means that the apps will be distributed in positions close to data channel points. At the same time, another strategy will be implanted into the scheduling module for data processing optimization.

Specifically, a step S1—a receiving and analysis step—is performed first: receiving a data processing demand from the client P, retrieving, from the industrial cloud 100, at least one app which needs to be installed for fulfilment of the data processing demand, and analysing required source data and an installation demand of the app.

Step S1 comprises a first sub-step S11, a second sub-step S12 and a third sub-step S13.

First of all, in the first sub-step S11, a data processing demand is received from the client P, and a workflow needed for fulfilment of the data processing demand is retrieved from the workflow library 140 of the industrial cloud 100. The client P submits the data processing demand to the scheduling module 120 of the industrial cloud 100. The data processing demand comprises a data processing objective, and is for example "determine the cause of abnormal vibration in the machine tool 300 on the IOT". The workflow library 140 comprises multiple workflows, which may be defined in advance by an expert or be a series of workflow packets organized after processing a large number of user data processing demands Specifically, the scheduling module 120 scans the workflow library 140 and subjects workflow descriptions and the data processing objective to semantic matching, so as to select a workflow capable of fulfilling the data processing objective.

Then, in the second sub-step S12, the workflow is resolved into multiple apps needed for fulfilment of the workflow. With regard to the workflow capable of fulfilling the data processing demand of the client P, it comprises multiple apps needed for fulfilment of the workflow, e.g. one of the multiple apps is the first app 411.

Finally, in the third sub-step S13, a semantic model of the multiple apps is read from the app semantic model module 131 of the app library 130 in the industrial cloud, and required source data and an installation demand of the multiple apps are analysed. For example, in this embodiment, the data processing demand inputted by a user is "determine the cause of abnormal vibration in the machine tool 300 on the IOT"; when the scheduling module 120 receives the data processing demand, source data needed for analysis of the data processing demand is vibration signals of the three vibration sensors connected to the machine tool 300, i.e. vibration signals of the first sensor 310, the second sensor 320 and the third sensor 330 as shown in FIG. 1.

Figure 2:
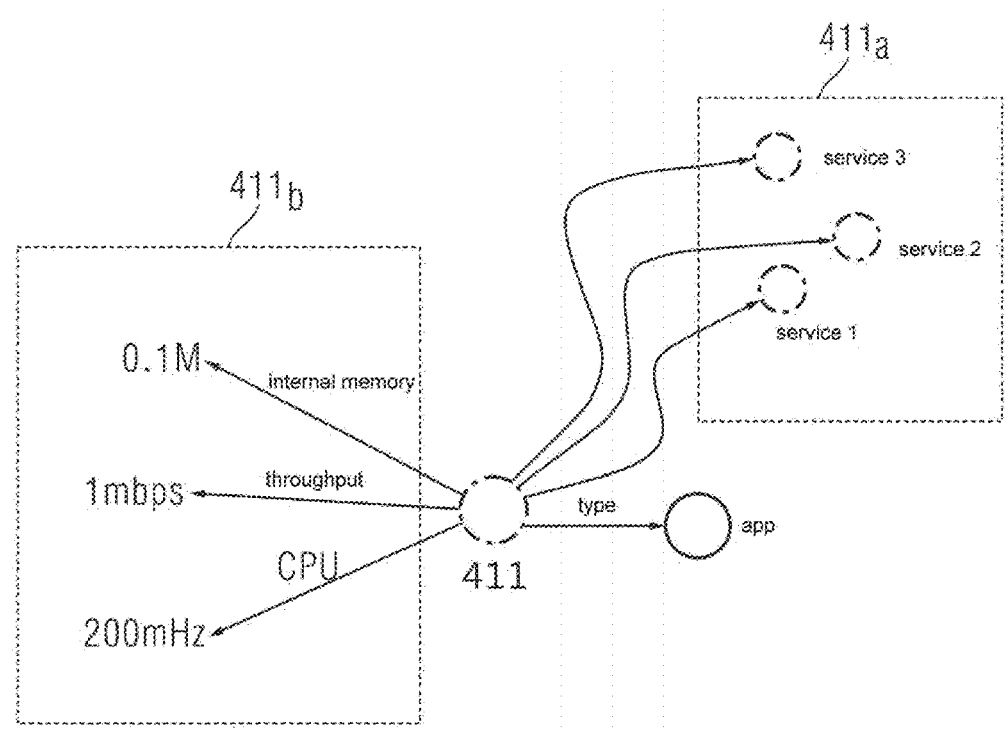
FIG. 2 is a schematic diagram of a semantic model of a first application 411 needed in a workflow according to a particular embodiment of the present invention.

Furthermore, the semantic model of the app is used for describing a demand of the app needed by the workflow, wherein the demand comprises a service demand and a system resource demand. The service demand describes a service needed by an app, e.g. a data service of a specific sensor. The system resource demand describes a system resource needed for running of an app, e.g. internal memory, CPU, network bandwidth. FIG. 2 is a schematic diagram of a semantic model of the first app 411, which is one of those needed in the workflow of this embodiment. In a service demand 411a, a function of the first app 411 comprises a service 1, a service 2 and a service 3. In a system resource demand 411b, the internal memory required by the first app 411 is 0.1M, the required throughput is 1 mbps, and the required CPU is 200 MHZ.

Then step S2 is performed, analysing at least one device end capable of providing the source program in the IOT, determining whether the device meets the installation demand of the app and provides the required source data. Specifically, a semantic model of at least one device end capable of providing the source program in the IOT is read in the semantic description layer 500, the semantic model is analysed, a determination is thereby made as to whether the device meets an installation demand of the app, and whether the device is able to provide the required source data. The step S2 further comprises a first sub-step S21 and a second sub-step S22.

In the first sub-step S21, the scheduling module 120 reads, in the semantic description layer 500, a semantic model of at least one device end capable of providing the source program in the IOT, analyses the semantic model, and thereby determines whether the device is able to provide the required source data.

Specifically, in this embodiment, the scheduling module 120 needs to retrieve, from the semantic description layer 500, semantic models of the vibration sensors connected to the machine tool 300, including the first sensor 310, the second sensor 320 and the third sensor 330. A description is given below, taking a semantic model of the first sensor 310 as an example.

The device end is described on the basis of semantics, and the semantic model of the device end comprises: an address model, comprising a name and address of the device end on the IOT; a resource model, describing multiple functions of the device end; a content model, describing a type and a connection relationship of the device end and another device.

Figure 3:
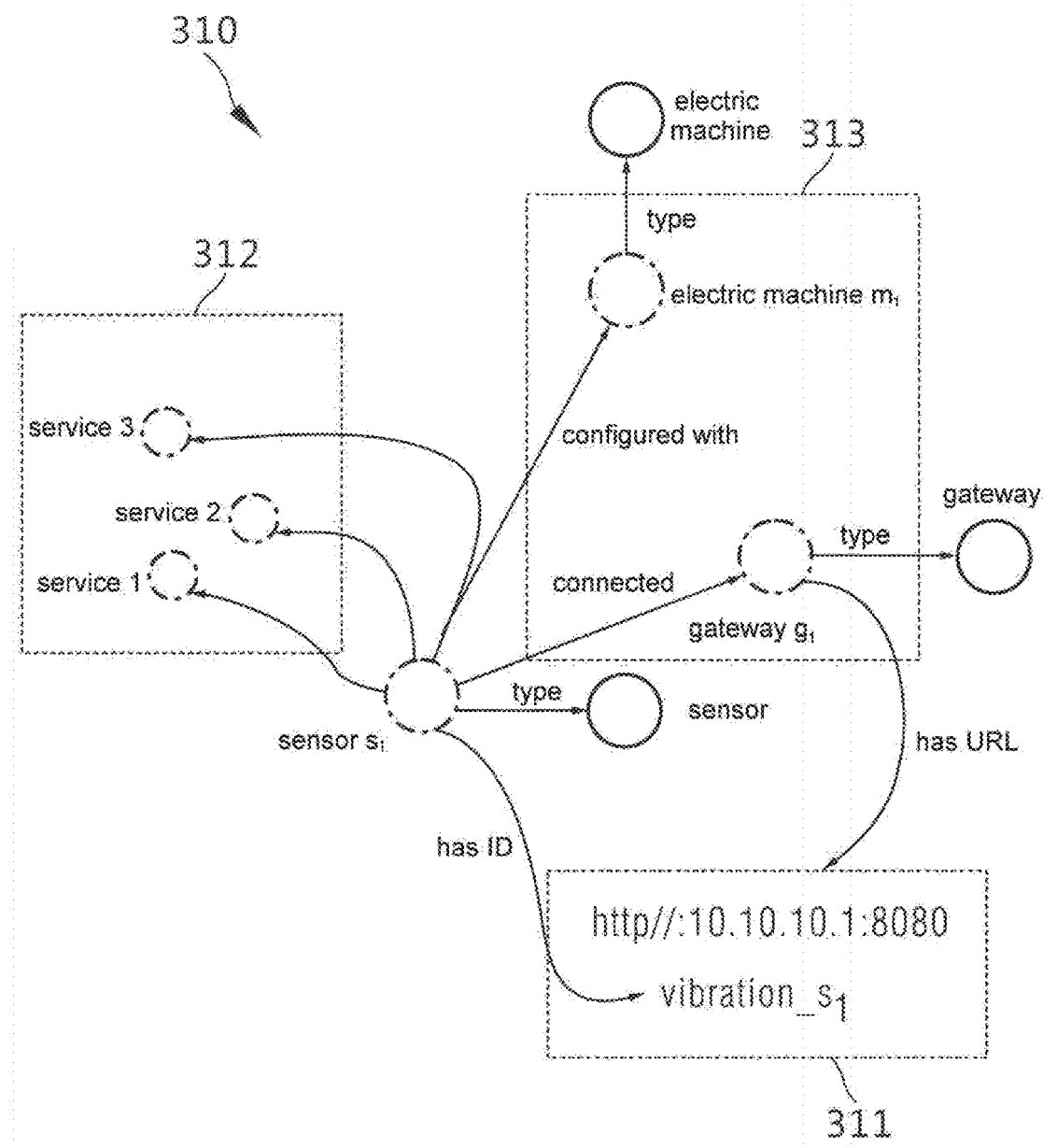
FIG. 3 is a schematic diagram of a semantic model in a semantic description layer 500 for a first sensor 310 connected to a machine tool 300 according to a particular embodiment of the present invention.

As an example, FIG. 3 shows a schematic diagram of a semantic model for the first sensor 310 connected to the machine tool 300 in the semantic description layer 500. The first sensor 310 comprises an address model 311, a resource model 312 and a content model 313. Specifically, as shown in FIG. 3, the first sensor 310 is a sensor S1 in the IOT, and the type thereof is a sensor. In the address model 311, a gateway g1 has an address (i.e. URL), specifically http://10.10.10.1:8080, and the sensor S1 has a name (i.e. ID) which is vibration_S1 (vibration sensor). In the resource model 312, the sensor S1 has three functions, namely service 1, service 2 and service 3. In the content model 313, the sensor S1 is connected to the gateway g1, and the type of the gateway g1 is a gateway. The sensor S1 is configured with an electric machine m1, and the type of the electric machine m1 is an electric machine.

Thus, based on the semantic model of the first sensor 310 described above, step S2 can determine whether the first sensor 310 is suitable for installation of the app. It must be explained that a semantic model of the first sensor 310 alone is described herein; the second sensor 320 and the third sensor 330 also have similar semantic models so as to determine whether they are suitable for installation of the app. For the sake of simplicity and clarity, these are not described here superfluously.

The scheduling module 120 the distribution and performance of the IOT device, to generate a feasible and highly efficient workflow execution plan. Thus, the semantic description layer 500 of the IOT device end is used for describing the distribution and performance of the device end of the IOT. The semantic description layer 500 of the IOT device end has three functions, a first function being to describe a capability of the IOT device, wherein the capability of the device is related to the service which the IOT device can provide. A second function is to describe a channel between source data and an app; data generated by each IOT device is the foundation for performing analysis in step S2, and each data source must be connected to a gateway. The gateway is responsible for source data (e.g. from the first sensor 310, the second sensor 320 and the third sensor 330 of the machine tool 300) and providing a channel for the provision of source data to an app. The form of a channel from source data to the app is tuple, comprising a gateway address and a source data id, etc. A third function is to describe content information of source data, the content information comprising a position of source data, and a relationship between source data and another IOT resource.

In the second sub-step S22, the scheduling module 120 reads a semantic model of the gateway 400 connected to the device, and thereby determines whether the gateway 400 connected to the device meets the installation demand of the app. The semantic model of the gateway 400 is disposed in the performance module 420.

Specifically, the semantic description layer 500 of the IOT device end can not only be used for describing the distribution and performance of the device end of the IOT, but can also describe a component on the industrial cloud 100, so that the scheduling module 120 of the industrial cloud 100 determines whether the app can be installed on the component of the industrial cloud 100.

Furthermore, the semantic model of the gateway comprises any one or more of the following:
CPU occupancy;
storage space and usable storage space capacity;
bandwidth;
throughput.

Figure 4:
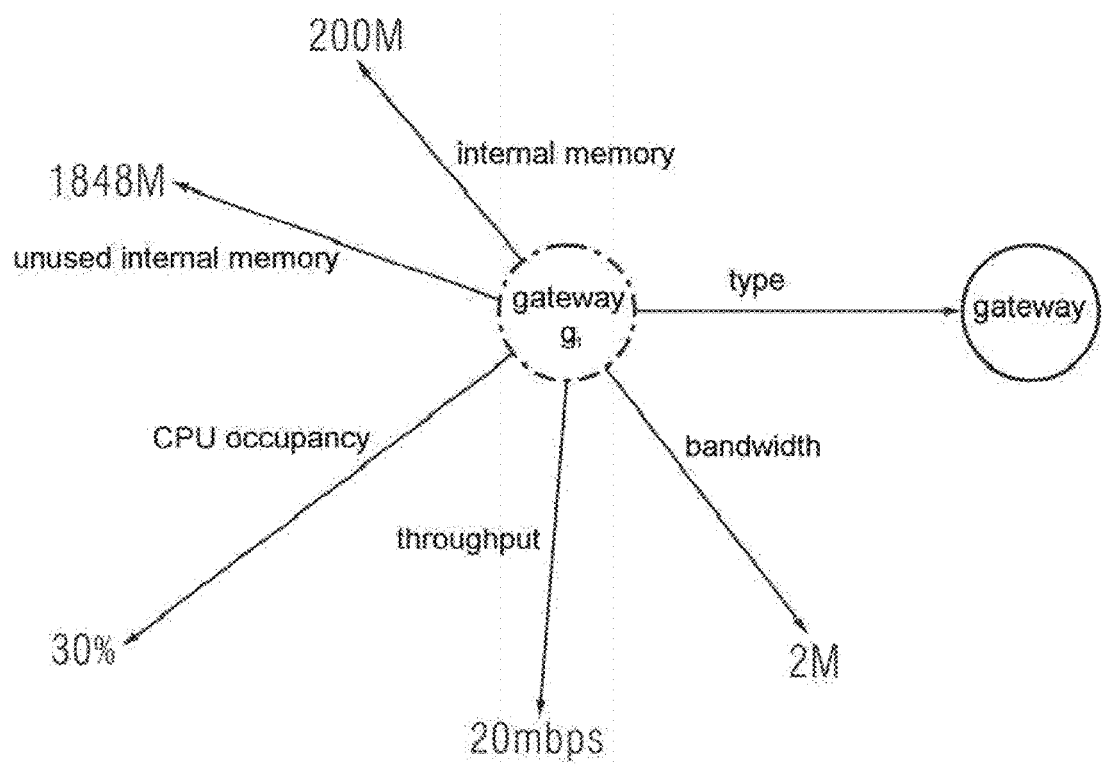
FIG. 4 is a schematic diagram of a semantic model of a gateway 400 described in a performance module 420 of the gateway 400 according to a particular embodiment of the present invention.

IOT device performance is the foundation for making the app distribution plan in the workflow, therefore the present invention also proposes a semantic model of IOT device performance. FIG. 4 shows a schematic diagram of a semantic model of the performance module 420 of the gateway 400 according to a particular embodiment of the present invention. The semantic model of the gateway 400 in the performance module 420 of the gateway 400, wherein the gateway 400 is the gateway g1 in FIG. 3. The type of the gateway g1 is a gateway, having an internal memory of 200M, an unused internal memory of 1848M, a CPU occupancy of 30%, a throughput of 20 mbps and a bandwidth of 2M. The performance module represents a device feature (device specific), which means that different devices have different performance modules. Compared with the semantic description layer of the IOT, the performance module is stored in the device, whereas the semantic description layer is stored in a server.

Step S3 is then performed: when the device end is able to meet the installation demand of the app, the app is installed in the gateway 400 corresponding to the device end. Specifically, according to this embodiment, after the semantic matching action in steps S1 and S2 mentioned above, when the device end (i.e. the first sensor 310) is able to meet the installation demand of the first app 411, the first app 411 is retrieved from the app library 130 in the industrial cloud 100, and the first app 411 is installed in the app container 410 in the gateway 400 corresponding to the device end.

Finally, step S4 is performed: based on the installed first app 411 etc., the data processing demand "determine the cause of abnormal vibration in the machine tool 300 on the IOT" of the client is fulfilled, thereby fulfilling the data processing demand "determine the cause of abnormal vibration in the machine tool 300 on the IOT" of the client.

A second embodiment of the present invention provides a semantics-based IOT device data processing-related app installation apparatus, comprising a scheduling module 120, used for: receiving a data processing demand from a client P, retrieving, from the industrial cloud 100, at least one app which needs to be installed for fulfilment of the data processing demand, and analysing required source data and an installation demand of the app; analysing at least one device end capable of providing the source program in the IOT, thereby determining whether the device meets the installation demand of the app and provides the required source data; and when the device end is able to meet the installation demand of the app, installing the app in the gateway 400 corresponding to the device end.

Furthermore, the scheduling module 120 is also used for: receiving a data processing demand from the client P, and retrieving a workflow needed for fulfilment of the data processing demand from the workflow library 140 of the industrial cloud 100; resolving the workflow into multiple apps needed for fulfilment of the workflow; reading a semantic model of the multiple apps from the app library 130 in the industrial cloud 100, and analysing required source data and an installation demand of the multiple apps.

Furthermore, the scheduling module 120 is also used for: reading, in the semantic description layer 500, a semantic model of at least one device end capable of providing the source program in the IOT, analysing the semantic model, and thereby determining whether the device is able to provide the required source data; reading a semantic model of the gateway 400 connected to the device, and thereby determining whether the gateway connected to the device meets the installation demand of the app.

Furthermore, the scheduling module 120 is also used for: when the device end is able to meet the installation demand of the app, retrieving the app from the app library 130 in the industrial cloud 100, and installing the app in the app container 410 in the gateway 400 corresponding to the device end.

Furthermore, the semantic model of the device end comprises: an address model 311, comprising a name and address of the device end on the IOT; a resource model 312, describing multiple functions of the device end; a content model 313, describing a type and a connection relationship of the device end and another device.

Furthermore, the semantic model of the gateway comprises any one or more of the following: CPU occupancy; storage space and usable storage space capacity; bandwidth; throughput.

Furthermore, the semantic model of the app is used for describing a demand of the app needed by the workflow, wherein the demand comprises a service demand 411a and a system resource demand 411b.

Furthermore, the scheduling module 120 is also used for: completing the workflow of the data processing demand of the client P on the basis of the installed app.

An embodiment of the present invention can evaluate the performance and the semantic model of the gateway of the IOT device end, according to the installation demand and the source data of the app, and thereby install, for the device end of the industrial IOT, the app needed for fulfilment of the client data processing demand, on the basis of the semantic model of the gateway and the app.

An embodiment of the present invention can release the app at the IOT device end, having a rational app runtime environment; this ensures that the data processing process is as close as possible to the data processing point, and greatly reduces the data transmission cost of the IOT system. An embodiment of the present invention is based on the IOT device end, the device end performance and the semantic model of the app, ensuring an IOT source data context-aware and IOT source data capability-aware distributed data computation procedure. An embodiment of the present invention can find a suitable running position in the IOT system for the app, on the basis of the semantic model, and optimizes the execution steps of the entire procedure.

Although the content of the present invention has already been presented in detail by way of the preferred embodiments above, it should be recognized that the above description should not be regarded as a restriction of the present invention. Various amendments and substitutions for the present invention will be obvious to those skilled in the art after perusal of the content above. Thus, the scope of protection of the present invention shall be defined by the attached claims. In addition, no reference labels in the claims should be regarded as restricting the claims concerned; the word "comprises" does not exclude an apparatus or step not set out in another claim or the description; and terms such as "first" and "second" are only used to indicate designations, not any specific order.

The invention claimed is:

1. A semantics-based Internet of Things (IOT) device data processing-related application installation method, the method comprising:
receiving a data processing demand from a client;
reading a semantic model of at least one application to be installed to fulfill the data processing demand from an application library in an industrial cloud,
analyzing required source data and an installation demand of the at least one application;
analyzing at least one device end capable of providing a source program in the IOT for installation of the at least one application to determine whether the at least one device end is able to meet the installation demand of the at least one application and provides the required source data; and
retrieving the at least one application from the application library and installing the at least one application in an application container in a gateway connected to the at least one device end in response to the at least one device end being determined to be able to meet the installation demand of the at least one application.

2. The semantics-based IOT device data processing-related application installation method of claim 1, further comprising:
retrieving a workflow to fulfill the data processing demand from a workflow library of the industrial cloud;
resolving the workflow into the at least one application to fulfill the workflow, the at least one application including multiple applications;
reading a semantic model of the multiple applications from the application library in the industrial cloud; and
analyzing required source data and an installation demand of the multiple applications.

3. The semantics-based IOT device data processing-related application installation method of claim 2, further comprising:

completing the workflow based on the installed at least one application.

4. The semantics-based IOT device data processing-related application installation method of claim 2, wherein the analyzing of the at least one device end includes
reading a semantic model of the at least one device end from a semantic description layer,
analyzing the semantic model of the at least one device end to determine whether the at least one device end is able to provide the required source data, and
reading a semantic model of the gateway to determine whether the gateway meets the installation demand of the multiple applications.

5. The semantics-based IOT device data processing-related application installation method of claim 2, wherein the semantic model of the multiple applications describes a demand of the multiple applications in a workflow, the demand including a service demand and a system resource demand.

6. The semantics-based IOT device data processing-related application installation method of claim 1, wherein the analyzing of the at least one device end includes
reading a semantic model of the at least one device end from a semantic description layer,
analyzing the semantic model of the at least one device end to determine whether the at least one device end is able to provide the required source data, and
reading a semantic model of the gateway to determine whether the gateway meets the installation demand of the at least one application.

7. The semantics-based IOT device data processing-related application installation method of claim 6, wherein the semantic model of the at least one device end includes at least one of
an address model including a name and an address of the at least one device end on the IOT,
a resource model which describes multiple functions of the at least one device end, or
a content model which describes a type and a connection relationship of the at least one device end and another device.

8. The semantics-based IOT device data processing-related application installation method of claim 6, wherein the semantic model of the gateway includes at least one of
a CPU occupancy,
a storage space and a usable storage space capacity,
a bandwidth, or
a throughput.

9. The semantics-based IOT device data processing-related application installation method of claim 1, wherein the semantic model of the at least one application describes a demand of the at least one application in a workflow, the demand including a service demand and a system resource demand.

10. A semantics-based Internet of Things (IOT) device data processing-related application installation apparatus, comprising:
a scheduling module configured to
receive a data processing demand from a client,
read a semantic model of at least one application to be installed to fulfill the data processing demand from an application library in an industrial cloud,
analyze required source data and an installation demand of the at least one application,
analyze at least one device end capable of providing a source program in the IOT for installation of the at least one application to determine whether the at least one device end is able to meet the installation demand of the at least one application and provides the required source data, and
retrieve the at least one application from the application library and install the at least one application in an application container in a gateway connected to the at least one device end in response to the at least one device end being determined to be able to meet the installation demand of the at least one application.

11. The semantics-based IOT device data processing-related application installation apparatus of claim 10, wherein the scheduling module is further configured to
retrieve a workflow to fulfill the data processing demand from a workflow library of the industrial cloud,
resolve the workflow into the at least one application to fulfill the workflow, the at least one application including multiple applications,
read a semantic model of the multiple applications from the application library in the industrial cloud, and
analyze required source data and an installation demand of the multiple applications.

12. The semantics-based IOT device data processing-related application installation apparatus of claim 11, wherein the scheduling module is further configured to complete the workflow based on the installed at least one application.

13. The semantics-based IOT device data processing-related application installation apparatus of claim 10, wherein the scheduling module is further configured to
read a semantic model of the at least one device end from a semantic description layer,
analyze the semantic model of the at least one device end to determine whether the at least one device end is able to provide the required source data, and
read a semantic model of the gateway to determine whether the gateway meets the installation demand of the at least one application.

14. The semantics-based IOT device data processing-related application installation apparatus of claim 13, wherein the semantic model of the at least one device end includes at least one of
an address model including a name and an address of the at least one device end on the IOT,
a resource model describing multiple functions of the at least one device end, or
a content model describing a type and a connection relationship of the at least one device end and another device.

15. The semantics-based IOT device data processing-related application installation apparatus of claim 13, wherein the semantic model of the gateway includes at least one of
a CPU occupancy,
a storage space and a usable storage space capacity,
a bandwidth, or
a throughput.

16. The semantics-based IOT device data processing-related application installation apparatus of claim 10, wherein the semantic model of the at least one application describes a demand of the at least one application in a workflow, the demand including a service demand and a system resource demand.

17. A semantics-based Internet of Things (IOT) device data processing-related application installation method, the method comprising:

receiving a data processing demand from a client;
reading a semantic model of at least one application to be installed to fulfill the data processing demand from an application library in an industrial cloud;
analyzing required source data and an installation demand of the at least one application;
analyzing at least one device end capable of providing a source program in the IOT for installation of the at least one application, the analyzing of the at least one device end including,
   reading a semantic model of the at least one device end from a semantic description layer,
   analyzing the semantic model of the at least one device end to determine whether the at least one device end provides the required source data, and
   reading a semantic model of a gateway connected to the at least one device end to determine whether the gateway meets the installation demand of the at least one application; and
installing the at least one application in the gateway in response to the at least one device end being determined to be able to meet the installation demand of the at least one application.

\* \* \* \* \*